United States Patent [19]

Gailey

[11] Patent Number: 5,673,524
[45] Date of Patent: Oct. 7, 1997

[54] REVERSIBLE COMPOSITE BUILDING PANEL

[75] Inventor: J. Lynn Gailey, Forney, Tex.

[73] Assignee: Alumet Building Products, Inc., Mesquite, Tex.

[21] Appl. No.: 631,086

[22] Filed: Apr. 12, 1996

[51] Int. Cl.$^6$ .................................. E04C 1/10
[52] U.S. Cl. ............... 52/309.9; 52/309.11; 52/588.1; 52/745.2; 52/745.19
[58] Field of Search ................ 52/309.9, 309.11, 52/588.1, 581, 582.1, 587.1, 589.1, 745.2, 745.19

[56] References Cited

U.S. PATENT DOCUMENTS

| | | |
|---|---|---|
| 2,284,229 | 5/1942 | Palmer. |
| 2,682,938 | 7/1954 | McDonald. |
| 3,293,812 | 12/1966 | Hammitt. |
| 3,295,278 | 1/1967 | Muhm. |
| 3,324,617 | 6/1967 | Knight ............................. 52/588.1 X |
| 3,331,173 | 7/1967 | Elsner. |
| 3,367,076 | 2/1968 | O'Brien. |
| 3,386,218 | 6/1968 | Scott. |
| 3,397,496 | 8/1968 | Johns. |
| 3,479,784 | 11/1969 | Massagli. |
| 3,535,844 | 10/1970 | Glaros ............................. 52/309.9 X |
| 3,742,672 | 7/1973 | Schaeufle. |
| 3,760,548 | 9/1973 | Sauer. |
| 3,854,260 | 12/1974 | O'Hanlon. |
| 4,186,539 | 2/1980 | Harmon. |
| 4,288,962 | 9/1981 | Kavanaugh. |
| 4,373,312 | 2/1983 | Kim. |
| 4,438,614 | 3/1984 | Raith. |
| 4,486,994 | 12/1984 | Fisher. |
| 4,640,074 | 2/1987 | Paakkinen. |
| 4,649,680 | 3/1987 | Weisner. |
| 4,748,783 | 6/1988 | Labelle. |
| 4,754,587 | 7/1988 | Glaser. |
| 4,769,963 | 9/1988 | Meyerson. |
| 4,936,078 | 6/1990 | Porter. |
| 5,086,599 | 2/1992 | Meyerson. |
| 5,138,812 | 8/1992 | Palmersten. |
| 5,247,770 | 9/1993 | Ting. |
| 5,274,979 | 1/1994 | Tsai. |
| 5,277,011 | 1/1994 | Serrano-Martin. |
| 5,293,728 | 3/1994 | Christopher. |
| 5,349,796 | 9/1994 | Meyerson. |
| 5,363,606 | 11/1994 | Esposito. |
| 5,381,638 | 1/1995 | Anderson. |
| 5,533,312 | 7/1996 | Mihalcheon ........................ 52/309.9 |

FOREIGN PATENT DOCUMENTS

| | | | |
|---|---|---|---|
| 2445180 | 4/1976 | Germany ........................ 52/309.9 |
| 1567161 | 5/1980 | United Kingdom ............. 52/309.9 |

Primary Examiner—Wynn E. Wood
Assistant Examiner—Aimee E. McTigue
Attorney, Agent, or Firm—Colin P. Cahoon

[57] ABSTRACT

Modular building panels having central insulating cores and protected by bonded sheet material are joined in a roof, wall, or other building system by way of an interlock feature that also provides a deep water drainage channel. This interlock feature utilizes an outwardly facing channel formed of the end of one of the bonded sheets which is mated with an inwardly extending locking member formed of the opposite end an identical bonding sheet from an adjacent panel. The inwardly extended locking member is inserted into the outwardly facing channel and rides over a camming surface which locks the inwardly extending locking member into the outwardly facing channel. Once two adjacent panels are joined together, the interlock feature forms a deep water drainage channel to catch and carry water and moisture that penetrates seams between the panels due to imperfections of caulking seal. The design allows for ease and simplicity in manufacture and installation and, in the event one side of the panel is damaged or it is otherwise desirable to expose the opposite side of the panel, the design disclosed herein permits such by rotating a single panel one hundred eighty degrees about its longitudinal axis.

5 Claims, 4 Drawing Sheets

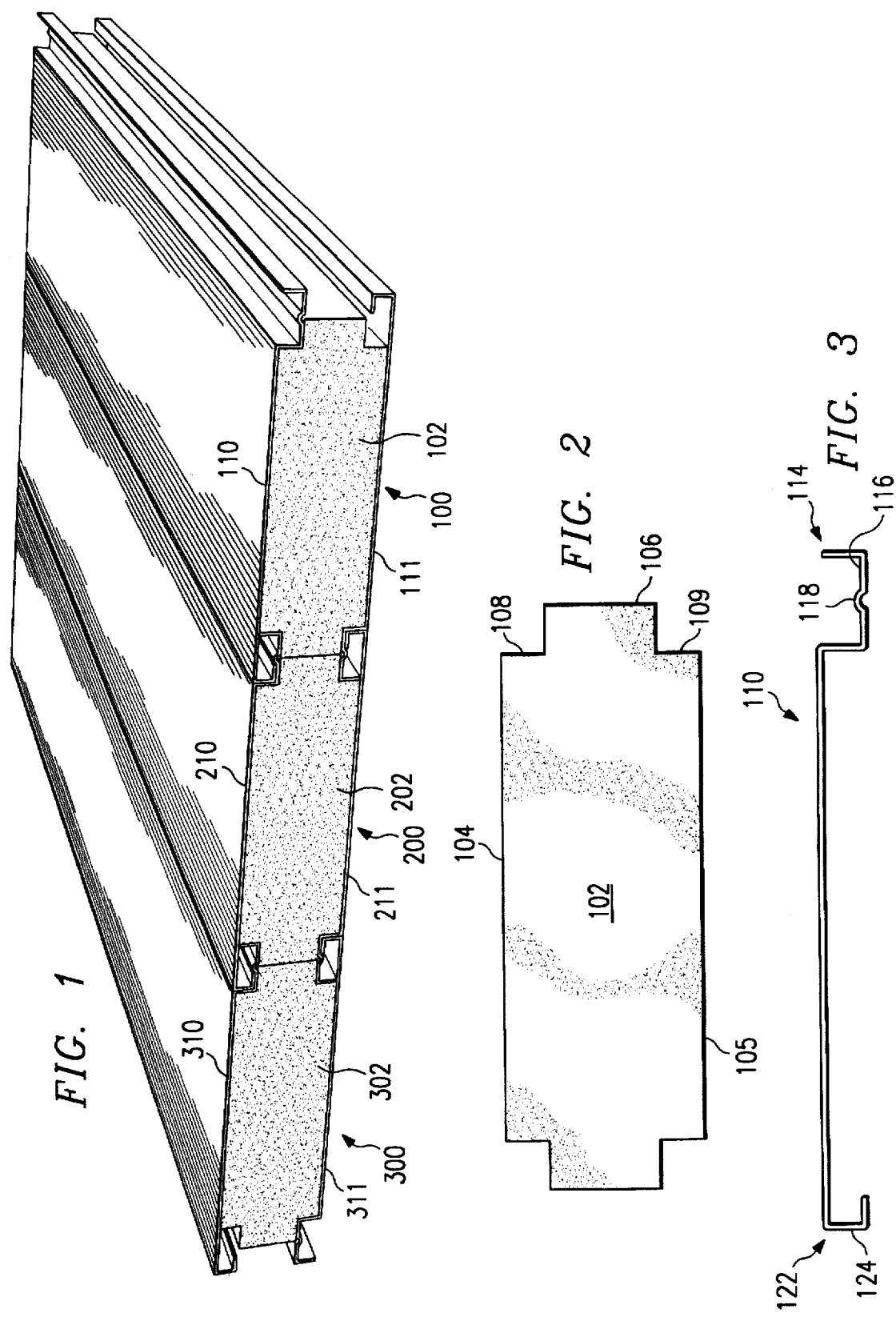

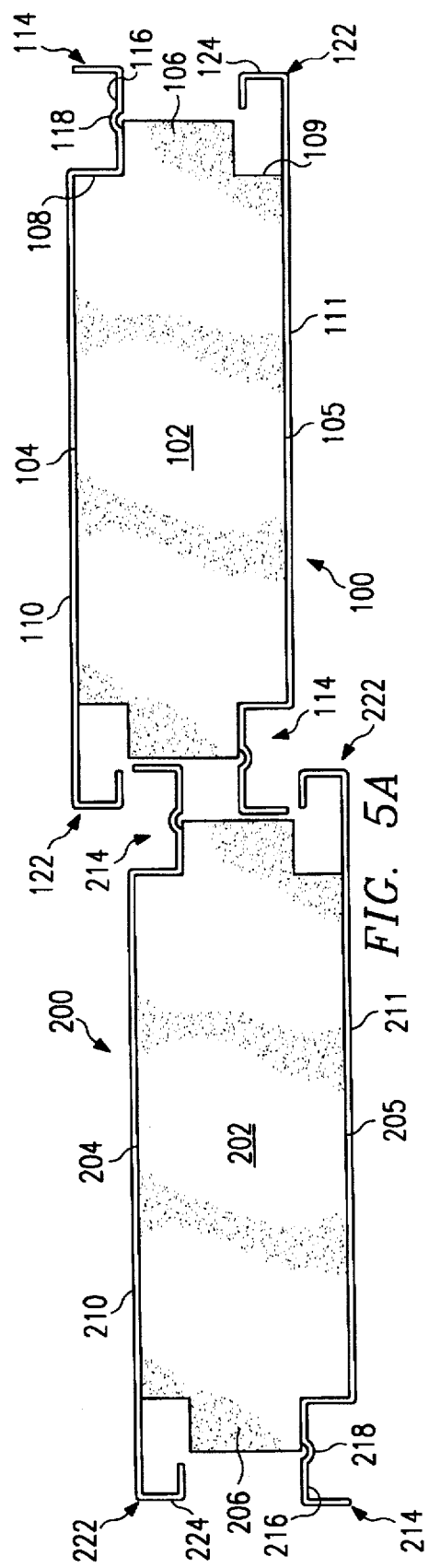
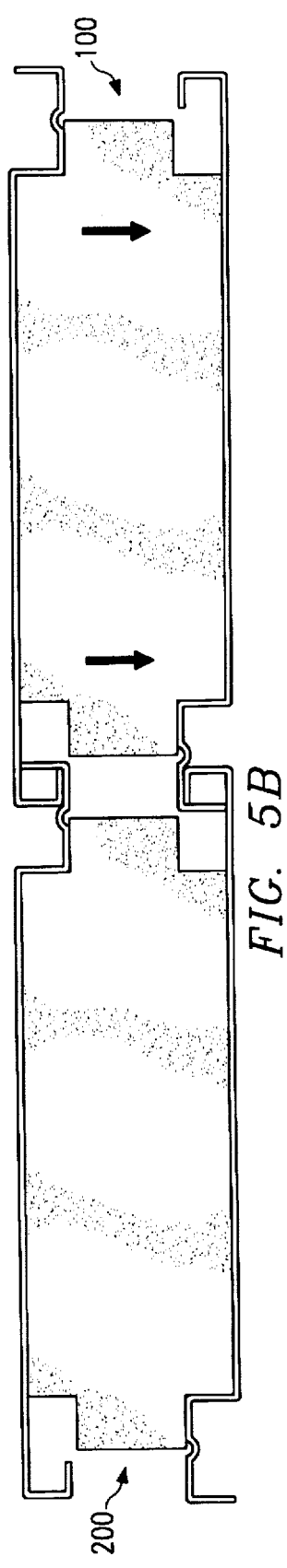
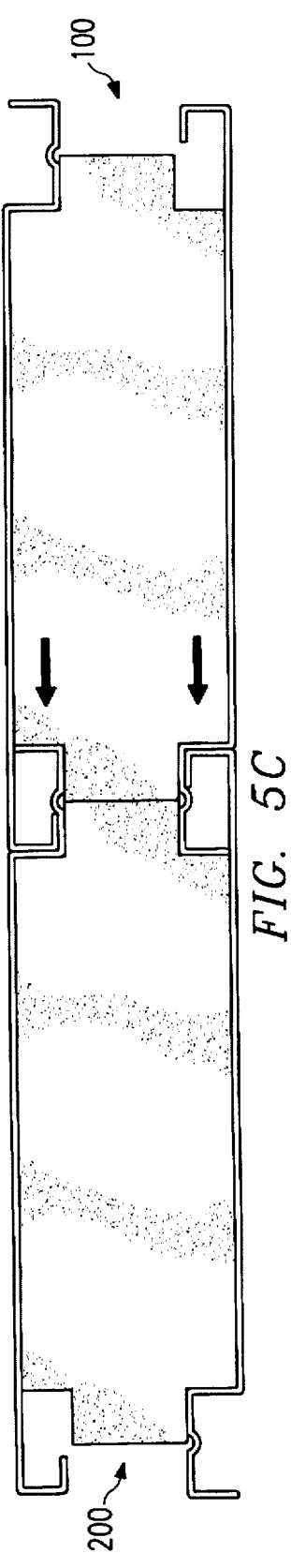
FIG. 5A
FIG. 5B
FIG. 5C

REVERSIBLE COMPOSITE BUILDING PANEL

CROSS-REFERENCE TO RELATED APPLICATIONS

None.

REFERENCE TO A MICROFICHE APPENDIX

None.

BRIEF SUMMARY OF THE INVENTION

This invention relates to interlocking building panels used, for example, for the quick and efficient installation of roofing materials for various building structures. This invention utilizes a flat core insulating material bonded on both sides by metal sheets, typically aluminum. The edges of these metal sheets extend beyond the edges of the core material and are constructed such to provide a means for interlocking the panels. Unlike the present state of the art regarding similar building panels, these interlocking means also provide two deep water channels at the joining edges of the panels. These large water channels catch and carry water and moisture that penetrate the seams between the panels due to imperfections in caulking seal used during installation of the panels.

This invention is also distinguished from the present art in that the formed sheets bonded to the core material are identical in shape or form on the top and bottom of the panel. The present art typically utilizes a male receiving end of the panel structure and a female insertion end of the panel structure for coupling of adjacent panels. The female insertion end of the panel is held in place by the tension of the opposing bonding sheets of the male panel end. In the event that one side of the panel is damaged or dented, the installer must turn the panel end to end and rotate it width-wise one hundred eighty degrees so that the damaged side of the panel is not exposed. Due to the unique design of the deep water channel coupling device in the present invention, a panel need only be rotated width-wise one hundred eighty degrees to accomplish the same result, thus saving the installer one directional move.

The interlocking feature of the present invention utilizes an outwardly facing channel formed of one of the bonded sheets which is mated with an inwardly extending locking member formed of the opposite end of the bonding sheet of an adjacent panel. The inwardly extending locking member is inserted into the outwardly facing channel and rides over a camming surface which locks the inwardly extending locking member into the outwardly facing channel. The core insulating material is cut at each longitudinal edge to provide a step down to accommodate the water channel and interlock feature. This step down allows for flush mating of adjacent panels at the core insulation material and significantly restricts the water channel and interlocking feature to provide the tension necessary for securing the fit between adjacent panels. As a result, unlike present art, tension as between the two opposing bonded sheets or insulation material on the female edge of a panel is not required to hold a male protrusion of a panel in place.

This present invention is a substantial improvement over the present art in providing increased ease and simplicity of installation, better water drainage capability and thus better overall insulation and resistance to leakage, as well as ease and simplicity in manufacture.

BRIEF DESCRIPTION OF THE DRAWINGS

Further objects and advantages of the present invention will become apparent from the following detailed description when read in conjunction with the accompanying drawings, in which:

FIG. 1 is a perspective end view of the joined panels of this invention.

FIG. 2 is an end view in elevation of the core insulating material of a single panel.

FIG. 3 is an end view in elevation of a single bonding sheet of skin material.

FIG. 5A is an end view in elevation of two adjacent panels of the invention placed in position for joining the two panels.

FIG. 5B is an end view in elevation of two adjacent panels of the invention after the end of one panel is dropped into the water channels of a second panel.

FIG. 5C is an end view in elevation of two adjacent panels of the invention interlocked after the two panels are pushed together.

DETAILED DESCRIPTION OF PREFERRED EMBODIMENT

Figure 4:
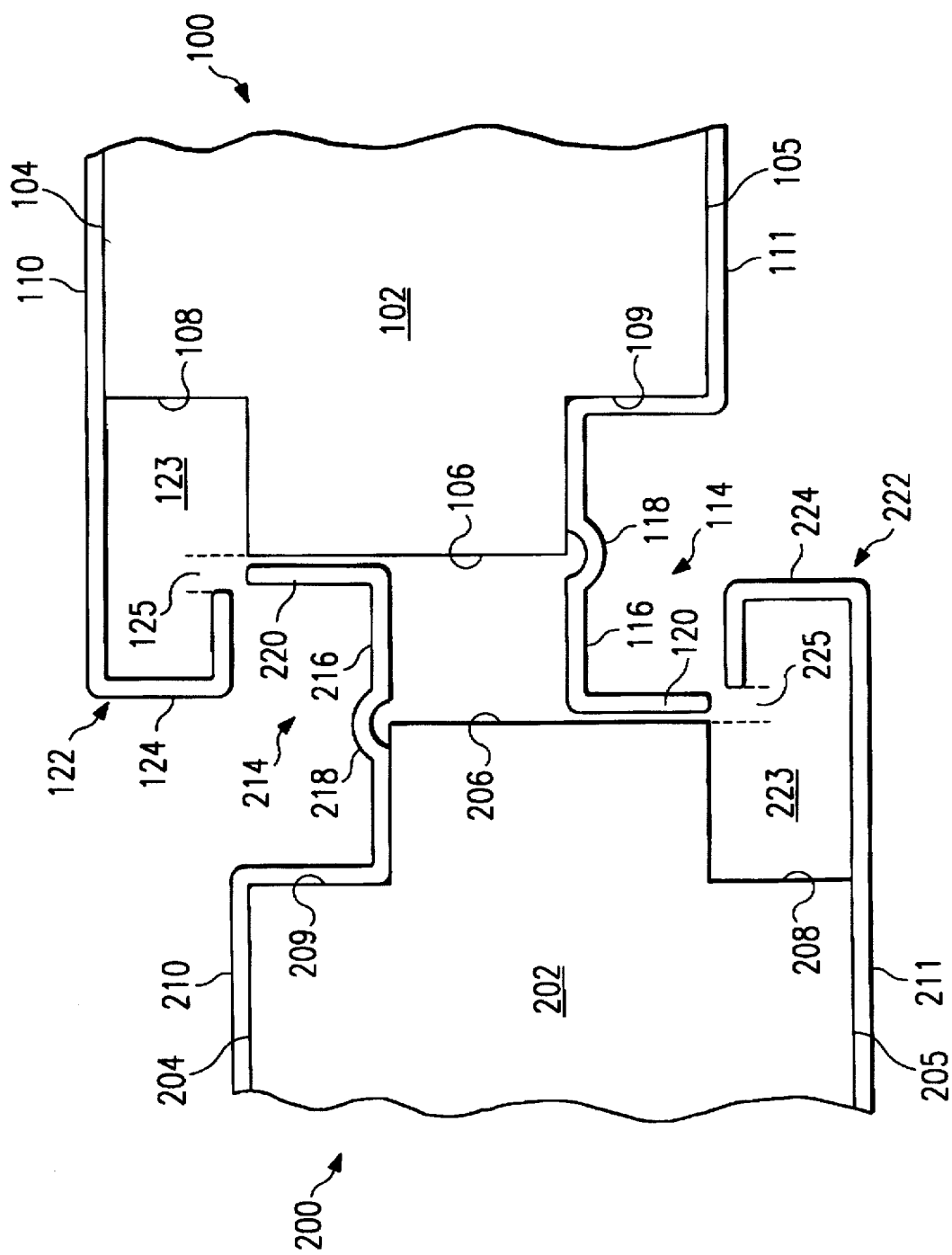
FIG. 4 is an exploded end view in elevation of the longitudinal edges of two adjacent panels placed in position for joining the two panels.

FIG. 1 shows three panels 100, 200, 300 of the invention joined together. FIG. 1 also shows the major components of the insulated panel invention 100, 200, 300 as a core insulating material 102, 202, 302, which is typically a commercial grade polystyrene or styrofoam, a first sheet of skin material 110, 210, 310, and a second sheet of skin material 111, 211, 311, both sheets typically constructed of aluminum or some other metal. The first sheet of skin material 110, 210, 310 on each said panel is shown in FIG. 1 as the exposed or exterior lateral surface of the completed assembly. The second sheet of skin material 111, 211, 311 of each panel is shown as an interior lateral surface of the completed assembly. Each individual panel 100, 200, 300 is reversible by rotating said panel one hundred eighty degrees about its longitudinal axis. It can be seen from FIG. 1 that such rotation would reverse the positioning of first sheet of skin of skin material 110, 210, 310 and the second sheet of skin material 111, 211, 311 such that the first sheet of skin material would form an interior lateral surface of the completed assembly while the second sheet of skin material would form the exterior lateral surface of the completed assembly. It is understood that the first sheet of skin material 110, 210, 310 and the second sheet of skin material 111, 211, 311 may have identical or different texture and physical appearance. By way of example, the first sheet of skin material 110, 210, 310 could be constructed of a smooth sheet of aluminum covered with an exterior weatherproof paint, while the second sheet of skin material 111, 211, 311 could be constructed of a sheet of aluminum having a textured surface and covered with an interior primer or paint suitable for interior walls of a building structure. This variation of the preferred embodiment, utilizing differences in texture and physical appearance as between the first and second sheet of skin material, allows the installer to select which lateral surface of the panel assembly should be outwardly (exterior) facing or inwardly (interior) facing when installed on the building structure. Conversely, the first sheet of skin material 110, 210, 310 and the second sheet of skin material 111, 211, 311 may be identical in texture and physical appearance. Such an embodiment may be preferable when only one lateral surface of the panel assembly is exposed in the anticipated application. By way of example, the invention may be utilized as a roofing material where an interior ceiling in the structure separates the occupied space of the structure from the roof application of the invention. In such application, only the exterior lateral surface 110, 210, 310 of the joined panels, as illustrated in FIG. 1, would be exposed. In the event that an installer discovers a dent or other irregularity in the first lateral surface of one of the panels of FIG. 1, for example the first lateral surface 210, the installer can rotate insulated panel 200 one hundred eighty degrees about its longitudinal axis, thereby exposing the second, and identical, sheet of skin material 211. Building panels utilizing the present art require the additional step of turning the panel end to end to accomplish the same procedure as just described for the invention disclosed herein.

FIG. 2 illustrates an end view of the core insulating material 102. The core insulating material 102 is defined by a first lateral surface 104 and a second lateral surface 105. At both ends of the first lateral surface 104 is shown a first shoulder 108 extending inwardly from said first lateral surface. Likewise, at either end of the second lateral surface 105 is a second shoulder 109 extending inwardly from said second lateral surface. Between said first and second shoulders there is shown a central tongue 106.

FIG. 3 shows the construction of the first sheet of skin material 110. A preferred embodiment of the invention may comprise a first sheet of skin material 110 identical to that of a second sheet of skin material 111, shown in FIG. 1. Each sheet of skin material 110, 111 has a first longitudinal edge 114 and a second longitudinal edge 122. The first longitudinal edge 114 comprises an outwardly facing channel 116 having a central section with an outwardly extending locking or camming surface 118. The second longitudinal edge 122 comprises an inwardly extending locking member 124.

The manufacture of the invention involves bonding the first sheet of skin material 110, as shown in FIG. 3, to the first lateral surface 104 of the core insulating material 102, as shown in FIG. 2. A second sheet of skin material 111, as shown in FIG. 1, is then bonded to the second lateral surface 105, such that from each longitudinal edge of the panel extends on outwardly facing channel 116 and an inwardly extending locking member 124, thus resulting in the completed construction of an insulated panel 100, 200, 300 as illustrated in FIG. 1.

FIGS. 5A, 5B, and 5C illustrate the installation of two adjacent insulated panels 100, 200. FIG. 5A shows the first step of the installation process which involves aligning the longitudinal edges of two adjacent panels 100, 200 such that the first longitudinal edge 214 and the second longitudinal edge 222 of panel 200 are positioned to receive the second longitudinal edge 122 and the first longitudinal edge 114 of the adjacent panel 100.

By referring to FIG. 4, it is shown that the panels 100, 200 are positioned so that an outwardly extending wall 120 of panel 100 is aligned with a transverse opening 225 of panel 200, and an outwardly extending wall 220 of panel 200 is aligned with a transverse opening 125 of panel 100. In the second step of the installation process, said panels are moved relative to each other such that the outwardly extending wall 120 of panel 100 enters said traverse opening 225 of panel 200 and the outwardly extending wall 220 of panel 200 enters said traverse opening 125 of panel 100 at substantially the same time. The result of the first two steps of the installation process is illustrated in FIG. 5B.

The third and final step of the installation process involves moving the panels laterally toward each other so that inwardly extending locking member 124, as shown in FIG. 4, is forced outward by the camming surface 218 as said inwardly extending locking member moves past said camming surface. At substantially the same time, inwardly extending locking member 224 is forced outwardly by camming surface 118 as said inwardly extending locking member moves past said camming surface. This results in a nested fit of outwardly facing channels 116, 216 within the lateral openings 123, 223, said lateral openings defined by first step down shoulders 108, 208 and second step down shoulders 109, 209, and further results in flush contact between central tongue 106 of panel 100 and central tongue 206 of panel 200. The completed installation of two adjoining panels is illustrated by FIG. 5C.

FIG. 5C further illustrates the two water channels formed by first longitudinal edge 214 and second longitudinal edge 222, seen in FIG. 4, when panel 100 is joined with panel 200. These large volume water drain channels catch and carry any water or moisture that penetrates the seams between the two panels due to any imperfections of caulking seal.

FIG. 5A is also illustrative of the ease and simplicity of manufacture of the invention. One method of manufacture involves bonding a first sheet of skin material 110, 210 to the first lateral surface 104, 204 of core material 102, 202. Core material 102, 202 with said bonded sheet can then be rotated one hundred and eighty degrees about its longitudinal axis. A second sheet of skin material 111, 211, from the same orientation of the previous application of said first sheet of skin material, can then be bonded to second lateral surface 105, 205. The present art, which utilizes a female and male longitudinal edge on each panel, would require the additional final manufacturing step of either reorienting the core material by turning said core once end to end about its vertical axis or reorienting the second sheet of skin material by turning said sheet once end to end about its vertical axis prior to bonding said sheet to the second lateral surface of said core.

Figure 6:
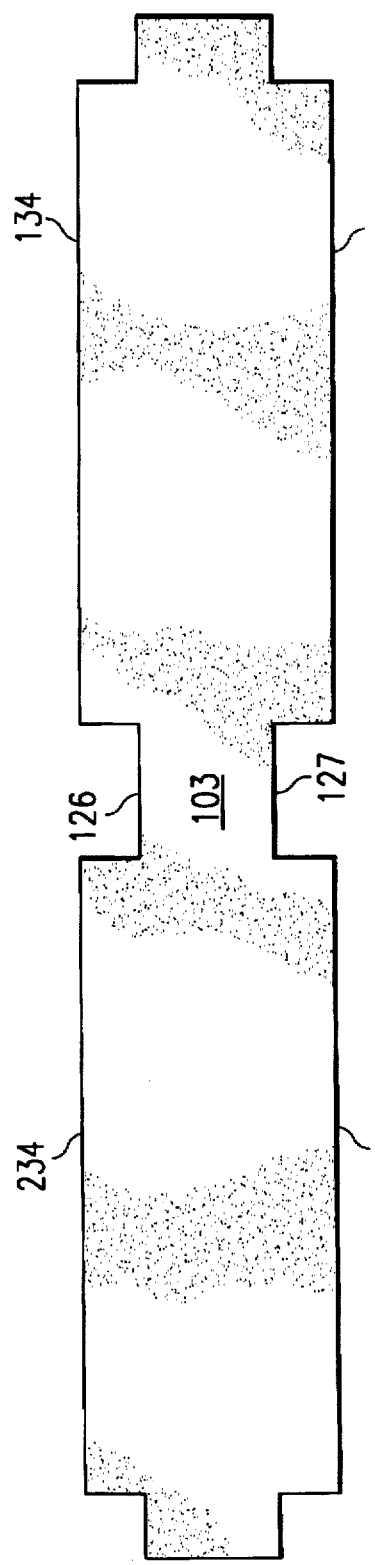
FIG. 6 is an end view in elevation of a single panel of the core insulation material cut to accommodate two narrower bonding sheets on each lateral surface of the panel.

FIG. 6 illustrates an alternate embodiment of core insulating material 102, shown in FIG. 2. It is understood that it may be desirable to manufacture insulated panels of the invention of a certain standard width, for example four feet. In this embodiment, core insulating material 102 would be manufacture at a width of four feet. It is also understood that it may be more economical, however, to manufacture narrower widths of the skin material, for example in approximate widths of two feet, for bonding to said core insulating material. These conditions could be met by the construction of core insulating material 103.

Figure 7:
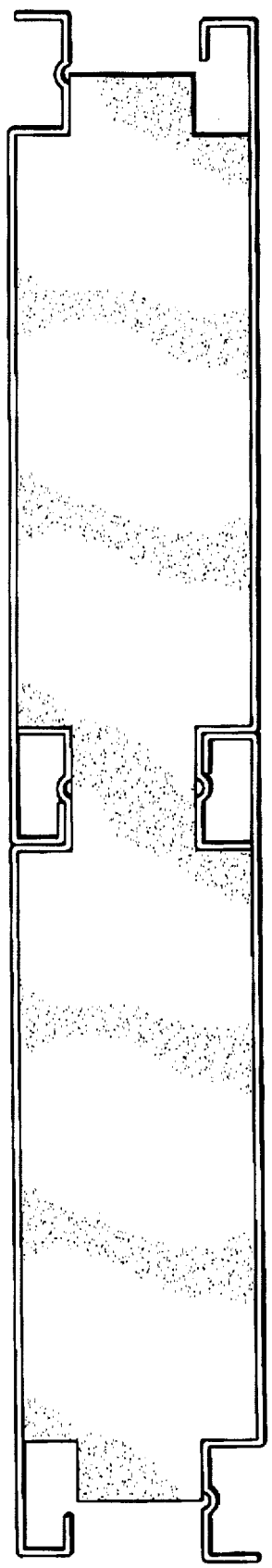
FIG. 7 is an end view in elevation of a single panel of the core insulation material cut to accommodate two narrower bonding sheets on each lateral surface of the panel and bonded with said sheets on each lateral surface.

Core insulating material 103, illustrated in FIG. 6, is identical to core insulating material 102, illustrated in FIG. 2, with the exception on core 103 of a first center cut channel 126 and a second center cut channel 127. Center cut channel 126 separates lateral surface 134 from lateral surface 234. Likewise, the second center cut channel 127 separates lateral surface 135 from lateral surface 235. A sheet of skin material 110, as illustrated in FIG. 3, can then be applied and bonded to each of the lateral surfaces 134, 135, 234, 235 oriented such that a nested fit between adjacent longitudinal edges of said sheets occurs within channels 126, 127. This alternative embodiment allows for the use of sheets of skin material 110 that are manufactured in narrower widths than the core insulating material 103. A single panel of this alternative embodiment of the invention is shown in FIG. 7.

It would be understood that various changes in the details, materials, and arrangements of parts which have been described herein and illustrated in order to explain the nature of the invention, may be made by those skilled in the art within the principal and scope of the invention as expressed in the following claims.

What is claimed is:

1. An insulated panel comprising:
   a core of insulating material having first and second lateral surfaces and first and second longitudinal edges; and
   two sheets of skin material each of said sheets being bonded to a separate lateral surface of said core, each of said sheets comprising:
   a first longitudinal edge comprising an outwardly facing channel having a central section with an outwardly extending locking surface; and a second longitudinal edge comprising an inwardly extending locking member;
   said longitudinal edges of said sheets being oriented on said core so that each longitudinal edge of said panel comprises one of said first longitudinal edges of said sheets and one of said second longitudinal edges of said sheets, whereby said panels are adapted to interlock with each other by pressing edges of adjacent panels together.

2. The insulated panel of claim 1, further comprising:
   said core of insulating material having a first center cut longitudinal channel on said first lateral surface and a second center cut longitudinal channel on said second lateral surface, such that two sheets of said skin material can be bonded to each of said lateral surfaces, said sheets oriented such that a nested fit between adjacent longitudinal edges of said sheets occurs within each of said center cut longitudinal channels.

3. An insulated panel comprising:
   a core of insulating material having first and second lateral surfaces and substantially similar first and second longitudinal edges; each of said edges comprising:
   a first shoulder extending inwardly from said first lateral surface; a second shoulder extending inwardly from said second lateral surface; and a central tongue between said first and said second shoulder; and
   two sheets of skin material each of said sheets being bonded to a separate lateral surface of said core, said sheets comprising:
   a first longitudinal edge that extends beyond said tongue and comprising an outwardly facing channel having a central section with one or more outwardly extending camming surfaces; and
   a second longitudinal edge that extends beyond said tongue and comprises an inwardly extending member designed and adapted to function as a cam follower;
   said edges of sheets of skin material being oriented on said core so that each longitudinal edge of said panel comprises one of said first longitudinal edges of said sheets and one of said second longitudinal edges of said sheets, whereby said panels are adapted to interlock with each other by pressing longitudinal edges of adjacent panels together so that:

the inwardly extending member of the second longitudinal edge of said sheets on a first panel is forced outward by the camming surface of the first longitudinal edge of said sheets on a second panel as said inwardly extending member moves past said camming surface; and
   the inwardly extending member of the second longitudinal edge of said sheets on a second panel is forced outward by the camming surface of the first longitudinal edge of said sheets on said first panel as said inwardly extending member moves past said camming surface.

4. The insulated panel of claim 3, further comprising:
   said core of insulating material having a first center cut longitudinal channel on said first lateral surface and a second center cut longitudinal channel on said second lateral surface, such that two sheets of said skin material can be bonded to each of said lateral surfaces, said sheets oriented such that a nested fit between adjacent longitudinal edges of said sheets occurs within each of said center cut longitudinal channels.

5. A method of interlocking insulated panels each of said panels comprising:
   a core of insulating material having first and second lateral surfaces and substantially similar first and second longitudinal edges; each of said edges comprising:
   A first shoulder extending inwardly from said first lateral surface; a second shoulder extending inwardly from said second lateral surface; and a central tongue between said first and said second shoulder; and
   two sheets of skin material each of said sheets being bonded to a separate lateral surface of said core and comprising:
   a first longitudinal edge that extends laterally beyond said tongue and comprising an outwardly facing channel having a central section with one or more outwardly extending camming surfaces and an outwardly extending end wall; and
   a second longitudinal edge that extends beyond said tongue and defines a lateral opening between said core and said longitudinal edge, said second longitudinal edge further comprising an inwardly extending member that defines a transverse opening between said core and said inwardly extending member;
   said method comprising the steps of:
   positioning said panels with a first panel adjacent to but laterally displaced from a second panel so that an outwardly extending wall on a first longitudinal edge of a sheet of skin material of the second panel is aligned with a transverse opening between the core and an inwardly extending member on a second longitudinal edge of a sheet of skin material of said first panel;
   moving at least one of said panels transversely so that said outwardly extending wall enters said transverse opening; and
   moving at least one of said panels laterally so that a channel on said second panel enters a lateral space between the core and a first longitudinal edge of said first panel.

* * * * *